(12) United States Patent
D'Angelo et al.

(10) Patent No.: US 12,477,999 B2
(45) Date of Patent: Nov. 25, 2025

(54) POWER LOPPER ATTACHMENT

(71) Applicant: TECHTRONIC CORDLESS GP, Anderson, SC (US)

(72) Inventors: Adam D'Angelo, Beaufort, SC (US); Caleb Cassidy, Myrtle Beach, SC (US); Drew Girshovich, Rock Hill, SC (US); Nicholas Park, Clemson, SC (US)

(73) Assignee: Techtronic Cordless GP, Anderson, SC (US)

(*) Notice: Subject to any disclaimer, the term of this patent is extended or adjusted under 35 U.S.C. 154(b) by 292 days.

(21) Appl. No.: 18/137,643

(22) Filed: Apr. 21, 2023

(65) Prior Publication Data

US 2023/0337589 A1   Oct. 26, 2023

Related U.S. Application Data

(60) Provisional application No. 63/334,339, filed on Apr. 25, 2022.

(51) Int. Cl.
*A01G 3/06* (2006.01)
*A01G 3/08* (2006.01)
*B25F 3/00* (2006.01)

(52) U.S. Cl.
CPC ............ *A01G 3/062* (2013.01); *A01G 3/08* (2013.01); *B25F 3/00* (2013.01)

(58) Field of Classification Search
CPC ...... B25B 13/465; A01G 3/0255; A01G 3/08; A01G 3/062; A01G 3/0335; B22F 3/00
USPC .............................................. 30/228; 192/46
See application file for complete search history.

(56) References Cited

U.S. PATENT DOCUMENTS

| | | | | |
|---|---|---|---|---|
| 4,692,825 | A  * | 9/1987 | Debaudringhien | F16D 41/12 |
| 2011/0179649 | A1 * | 7/2011 | Park | B23D 21/04 |
| | | | | 30/95 |
| 2011/0258859 | A1 * | 10/2011 | Schofield | A01G 3/0255 |
| | | | | 83/571 |

FOREIGN PATENT DOCUMENTS

| | | |
|---|---|---|
| CA | 3092714 A1 | 3/2021 |
| DE | 202017007189 U1 | 1/2020 |
| WO | WO2020094249 A1 | 5/2020 |

OTHER PUBLICATIONS

European Search Report Corresponding with Application No. EP23169269 on Sep. 21, 2023 (2 pages).

* cited by examiner

*Primary Examiner* — Nhat Chieu Q Do
(74) *Attorney, Agent, or Firm* — Dority & Manning, P.A.

(57) ABSTRACT

A lopper or lopper head attachment includes a primary gear, a secondary gear, a ratchet gear, an engagement flag, a dampened lag bolt, and a cutting blade. The secondary gear is enmeshed with the primary gear. The secondary gear defines a lag groove radially offset from the secondary axis. The ratchet gear is rotatable about a secondary axis separately from the secondary gear. The engagement flag is rotatably mounted to secondary gear to move between an unengaged position and an engaged position. The dampened lag bolt is slidably received within the lag groove to move relative to the secondary gear between a permissive position and a restrictive position. The cutting blade is in mechanical communication with the ratchet gear to be pivoted thereby, in the engaged position of the engagement flag, to a closed position from an open position.

20 Claims, 8 Drawing Sheets

POWER LOPPER ATTACHMENT

FIELD OF THE INVENTION

The present subject matter relates generally to power tools, and more particularly to powered lopper, pruner, or cutting tools.

BACKGROUND OF THE INVENTION

A lopper is an outdoor tool that is commonly used for pruning all kinds of bushes and branches, etc., in gardens. Electric loppers are widely used on account of such characteristics as being lightweight, convenient to operate, safe and reliable.

Existing electric loppers generally comprise a cutter set, wherein a lower cutter is fixed, and an upper cutter reciprocates up and down under the driving action of a drive means, in order to prune bushes and branches, etc. Often, an upper cutter is required to fully close or move down before returning to an open position.

BRIEF DESCRIPTION OF THE INVENTION

Issues can arise for returning the upper cutter to an open or up position if, for instance, a trigger is released prior to the upper clutter fully closing. Under certain conditions, such as when dealing with an item that is especially large, it may be desirable to return the upper cutter to the open position before fully closing or attempting to finish cutting a given item.

Improved lopper designs, and in particular lopper designs which can be integrated into existing tool systems, are desired in the art and would be advantageous.

Aspects and advantages of the invention will be set forth in part in the following description, or may be obvious from the description, or may be learned through practice of the invention.

In one exemplary aspect of the present disclosure, a lopper is provided. The lopper may include a tool motor, a drive shaft, a primary gear, a secondary gear, a ratchet gear, an engagement flag, a dampened lag bolt, and a cutting blade. The drive shaft may extend along a primary axis. The drive shaft may be mechanically coupled to the tool motor to be rotated thereby. The primary gear may be in mechanical communication with the drive shaft and rotatable about the primary axis. The secondary gear may be enmeshed with the primary gear and rotatable about a secondary axis. The secondary gear may define a lag groove radially offset form the secondary axis. The ratchet gear may be rotatable about the secondary axis separately from the secondary gear. The engagement flag may be rotatably mounted to secondary gear to move between an unengaged position apart from the ratchet gear and a engaged position disposed on and in mechanical communication with the ratchet gear. The dampened lag bolt may be slidably received within the lag groove to move relative to the secondary gear between a permissive position permitting the engagement flag to the unengaged position and a restrictive position holding the engagement flag in the engaged position. The cutting blade may be in mechanical communication with the ratchet gear to be pivoted thereby, in the engaged position of the engagement flag, to a closed position from an open position.

In another exemplary aspect of the present disclosure, a lopper head attachment is provided. The lopper head attachment may include a primary gear, a secondary gear, a ratchet gear, an engagement flag, a dampened lag bolt, and a cutting blade. The primary gear may be rotatable about the primary axis. The secondary gear may be enmeshed with the primary gear and rotatable about a secondary axis. The secondary gear may define a lag groove radially offset form the secondary axis. The ratchet gear may be rotatable about the secondary axis separately from the secondary gear. The engagement flag may be rotatably mounted to secondary gear to move between an unengaged position apart from the ratchet gear and a engaged position disposed on and in mechanical communication with the ratchet gear. The dampened lag bolt may be slidably received within the lag groove to move relative to the secondary gear between a permissive position permitting the engagement flag to the unengaged position and a restrictive position holding the engagement flag in the engaged position. The cutting blade may be in mechanical communication with the ratchet gear to be pivoted thereby, in the engaged position of the engagement flag, to a closed position from an open position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

according to exemplary embodiments of the present disclosure.

Figure 2:
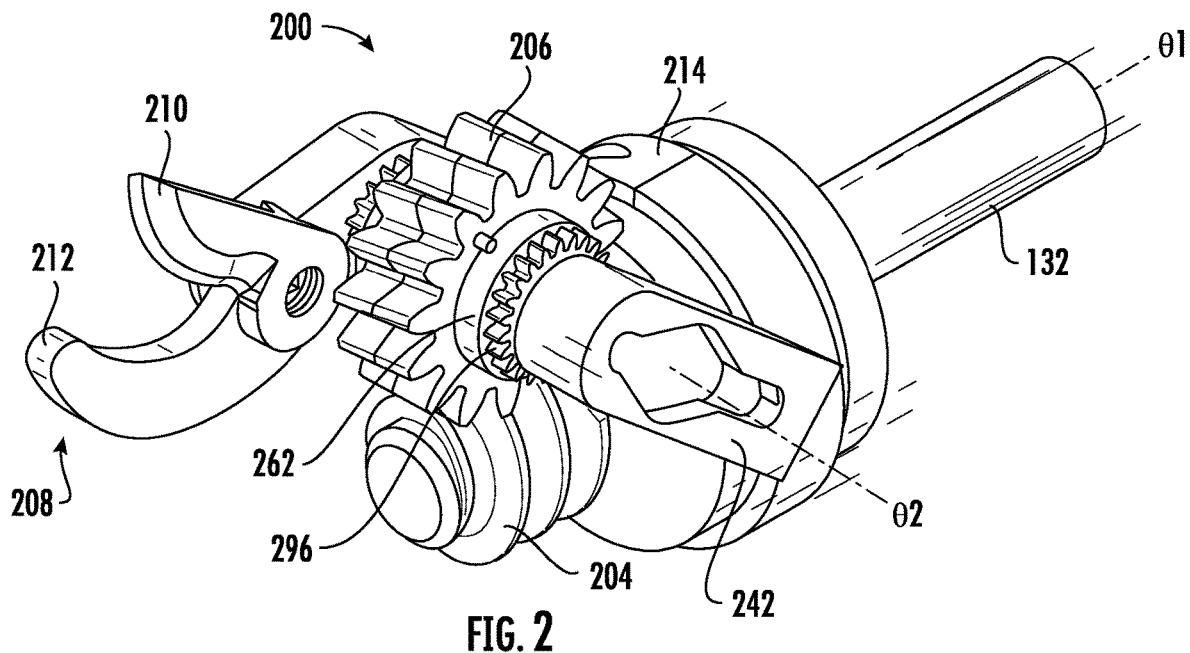
FIG. 2 provides a perspective view of a lopper head for a tool according to exemplary embodiments of the present disclosure.
Figure 12:
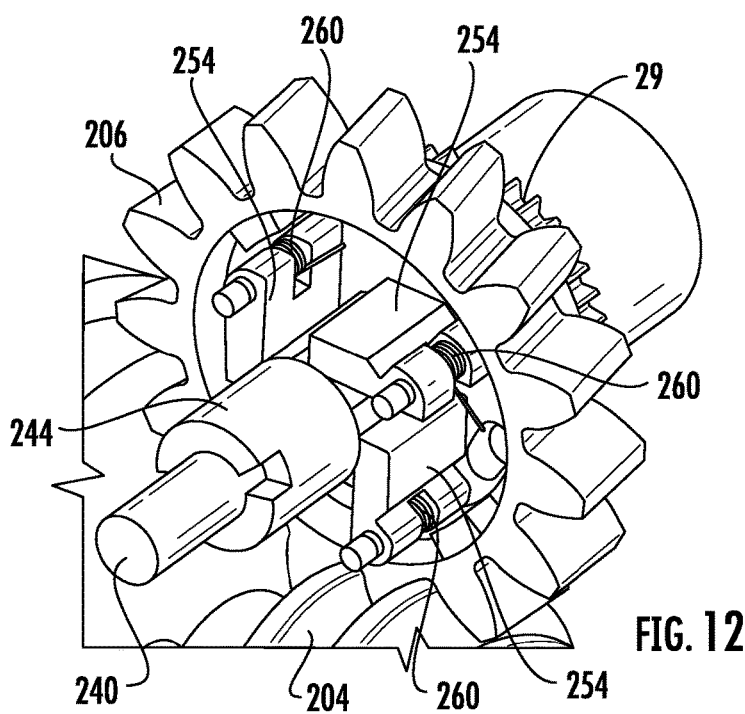

FIG. 12 provides a perspective view of an interior portion of the secondary gear and multiple engagement flags of the exemplary lopper head of FIG. 2.

Figure 13A:
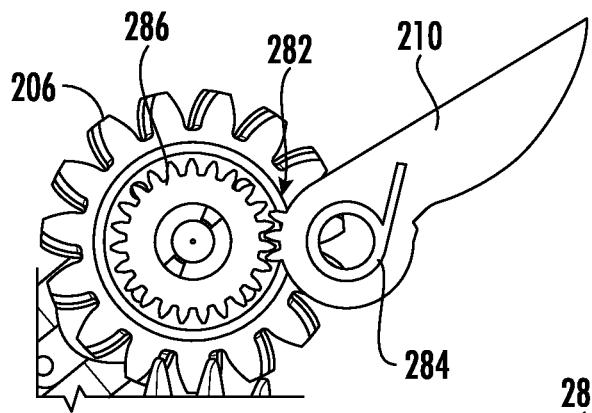

FIG. 13A provides a plan view of a cutter blade of the exemplary lopper head of FIG. 2, wherein the cutter blade is in an open position.

Figure 13B:
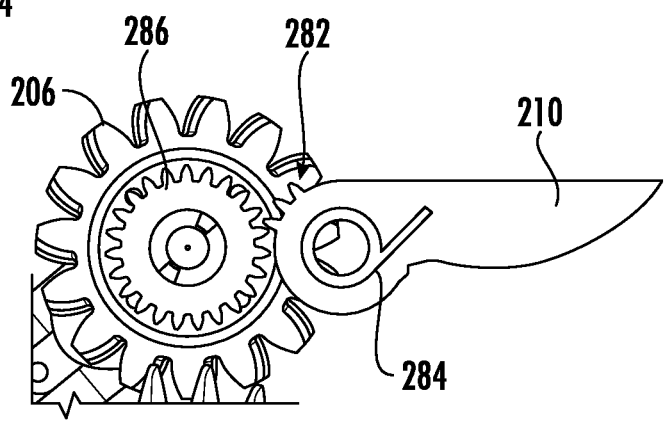

FIG. 13B provides a plan view of a cutter blade of the exemplary lopper head of FIG. 2, wherein the cutter blade is in a closed position.

Figure 14:
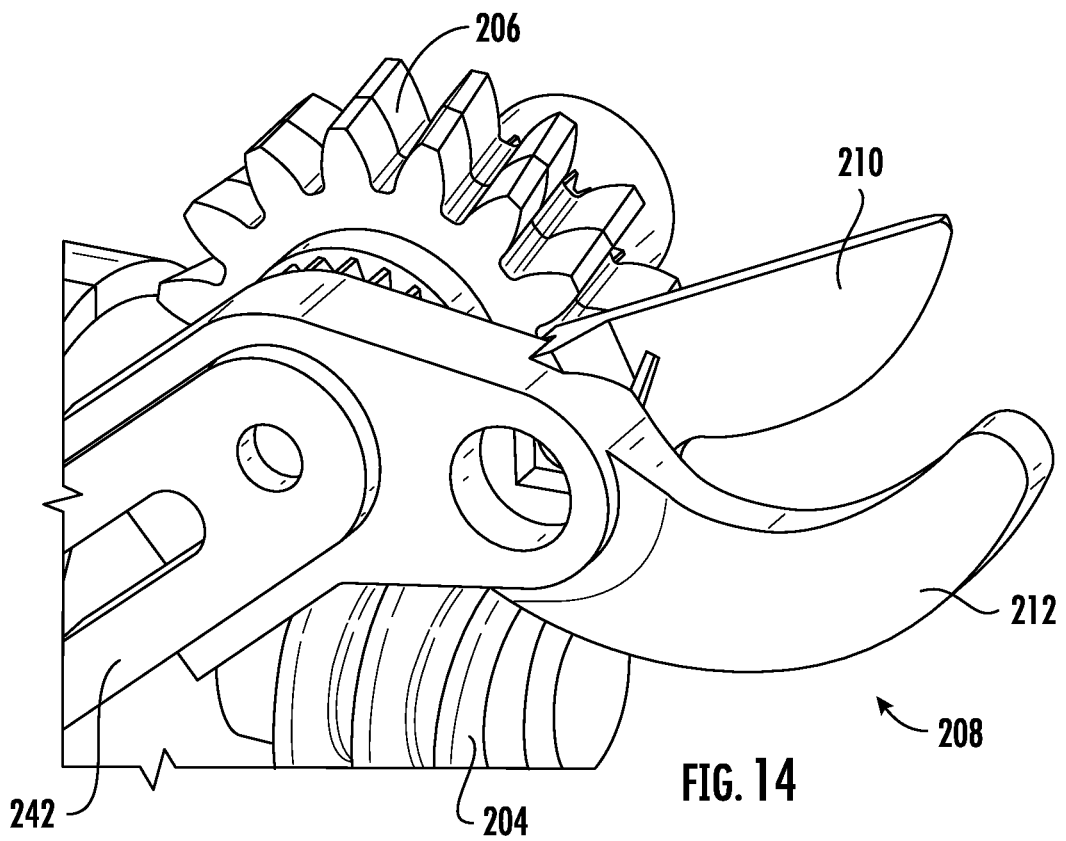

FIG. 14 provides a perspective view of a portion of the exemplary lopper head of FIG. 2

Figure 15:
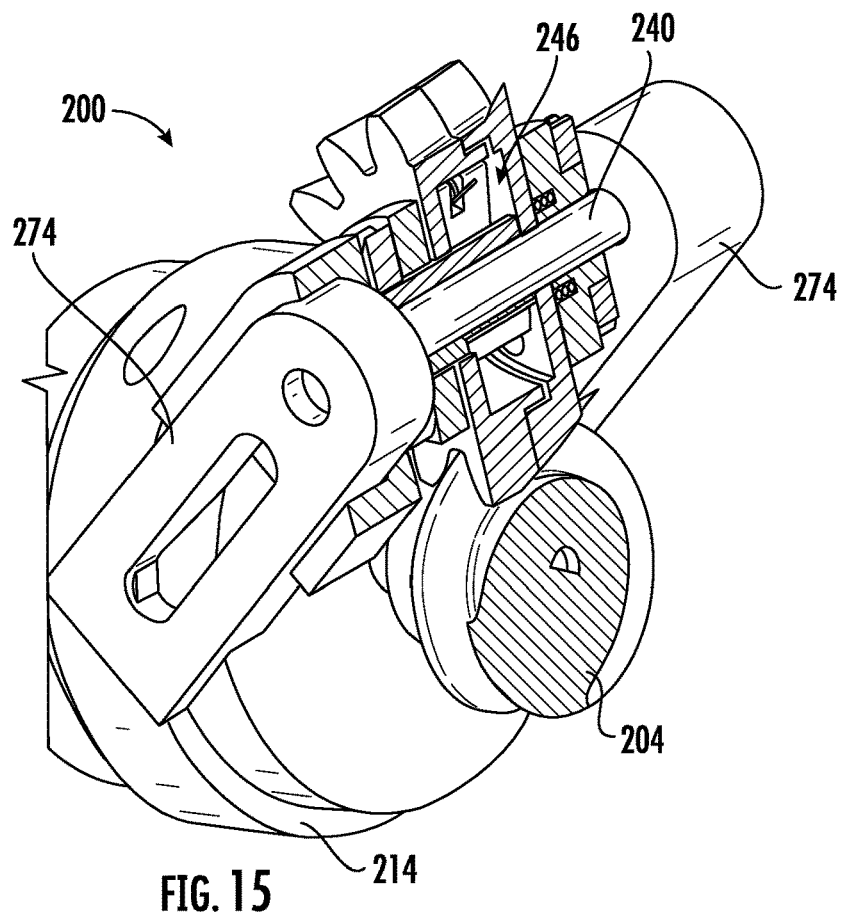

FIG. 15 provides a cross-sectional perspective view of a portion of the exemplary lopper head of FIG. 2

Figure 16:
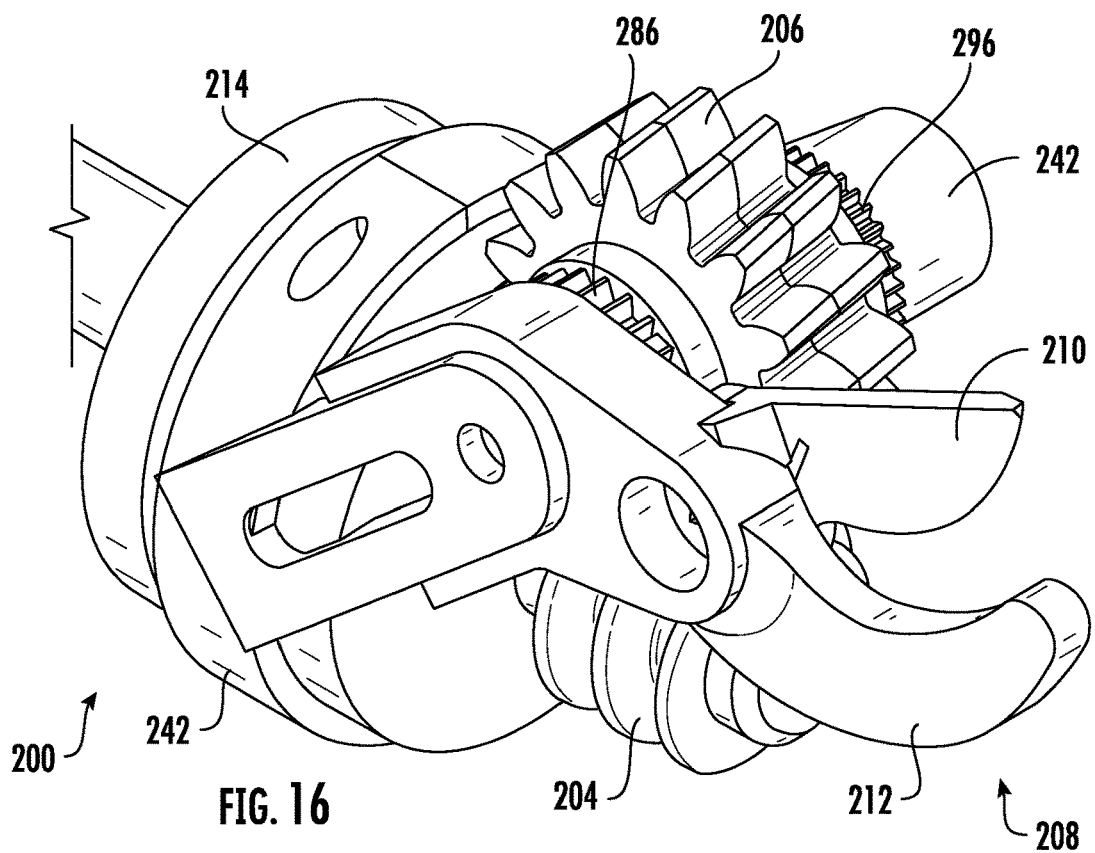

FIG. 16 provides a perspective view of a portion of the exemplary lopper head of FIG. 2

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive-or. For example, a condition A or B is satisfied by any one of the following: A is true (or present) and B is fake (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, power tools or systems in accordance with the present disclosure can provide a lopper or lopper head attachment that can connect to a powered motor to move a cutting blade. For instance, the motor can be connected to a trigger that activates the motor. The lopper or lopper head attachment can then be configured to move in response to actuation of the trigger and activation of the motor. For instance, the lopper or lopper head attachment can perform one cut per trigger pull while also allowing the blade to return to the open position upon release of the trigger at any point in the cut.

Figure 1:
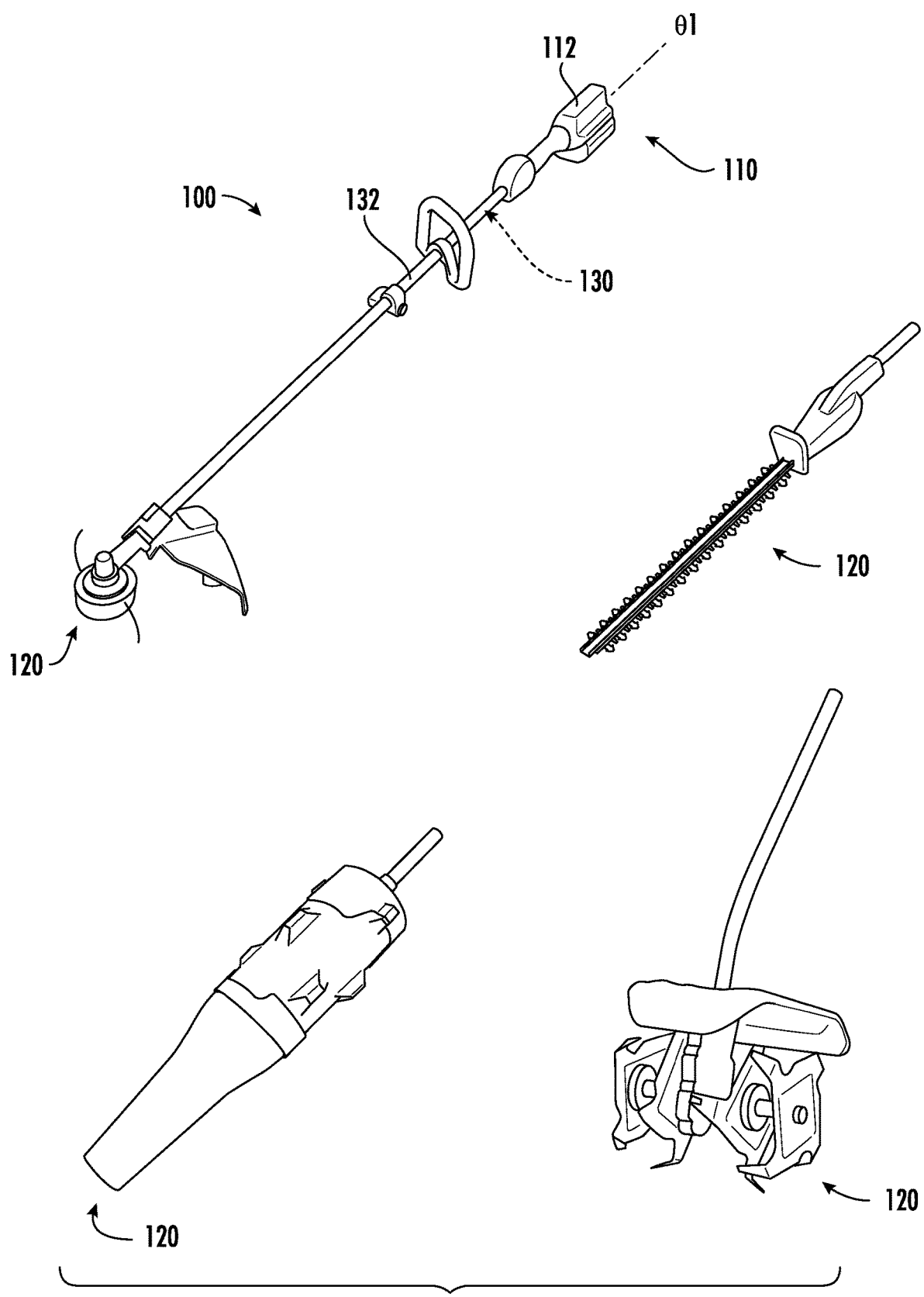
FIG. 1 provides a perspective view of a tool system according to exemplary embodiments of the present disclosure.

Turning now to the figures, FIG. 1 provide a perspective view of a tool system (e.g., lopper) 100 according to exemplary embodiments of the present disclosure. Generally, the tool system 100 provides at base assembly 110 having at least one tool motor 112 (e.g., electric DC motor and battery pack or internal combustion engine) and drive shaft 130 (e.g., mounted within a shaft pole 132) that extends along a shaft axis (e.g., primary axis θ1)$jhtr$ and configured to be rotated by the tool motor 112, as is understood. For instance, the drive shaft 130 may be mechanically coupled to the tool motor 112 to be rotated thereby. The tool motor 112 may be in operable communication with an input (e.g., trigger or switch). The input may be configured (e.g., either directly or through an intermediate controller) to activate the tool motor 112. As shown, one or more attachment heads 120 may be provided to selectively and separately connect to the base assembly 110. Generally, such attachment heads 120 may be configured as distinct tool heads configured for distinct operations (e.g., string trimmer head, hedge trimmer head, blower head, tiller head, lopper head, etc.). In turn, the base assembly 110 may be selectively coupled and uncoupled from the various attachment heads 120 to perform various distinct functions motivated by the tool motor 112 through a coupling with the drive shaft 130.

Figure 3:
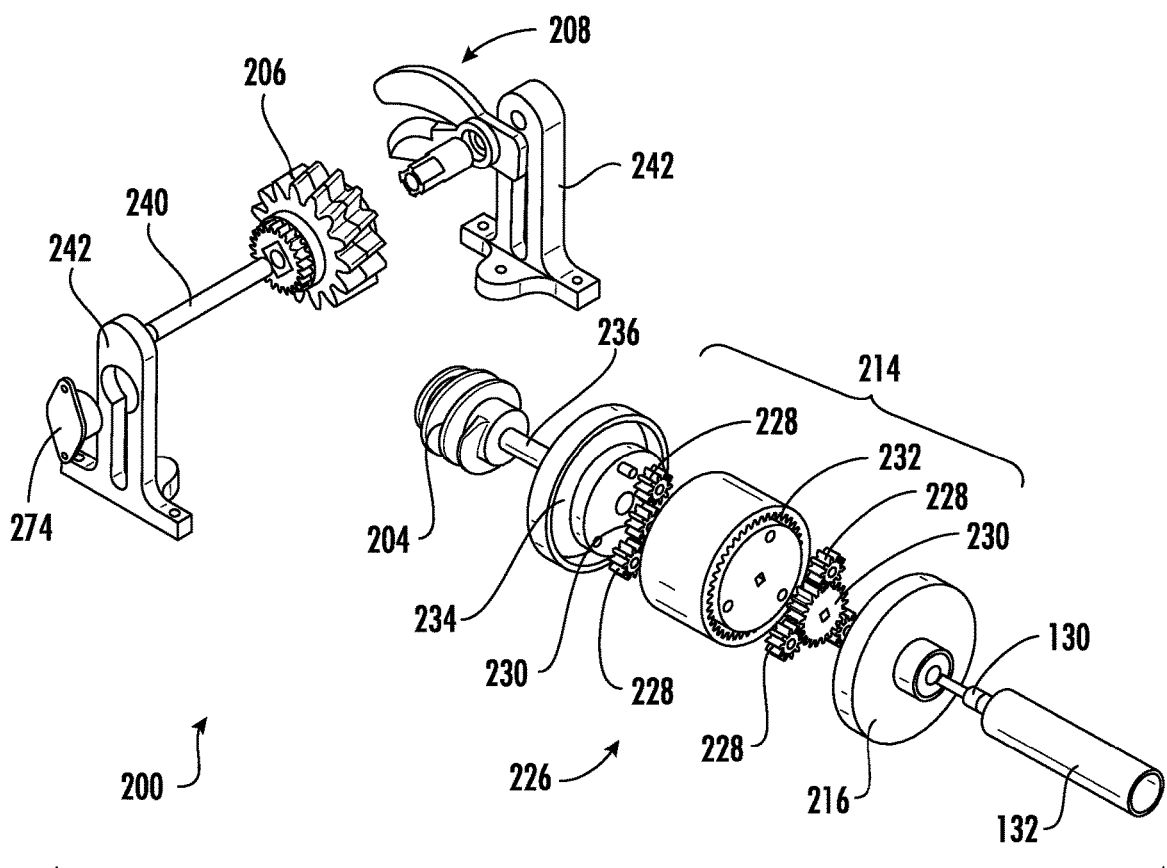
FIG. 3 provides an exploded perspective view of the exemplary lopper head of FIG. 2.

Turning now to FIGS. 2, 3, and 16, various perspective views are provided of a lopper head 200 (e.g., to be used as an attachment head 120 for tool system 100—FIG. 1) in both an assembled state (FIGS. 2 and 16) and a disassembled or exploded state (FIG. 3) for clarity. Generally, lopper head 200 includes a gearing assembly having multiple gears coupled or in communication with each other to drive a blade assembly 208. Specifically, lopper head 200 may include a primary gear 204 that is in downstream mechanical communication with drive shaft 130 (e.g., to be driven by the same) and upstream mechanical communication with a secondary gear 206 and a cutting blade 210 (e.g., to drive or motivate rotation of the same). For instance, as will be described in detail below, secondary gear 206 may be enmeshed with the primary gear 204 and in selective mechanical communication with the cutting blade 210. Although lopper head 200 is generally illustrated as having gearing assembly open and exposed for clarity, one of ordinary skill would understand that a casing or housing to cover various elements of gearing assembly during use.

Figure 4:
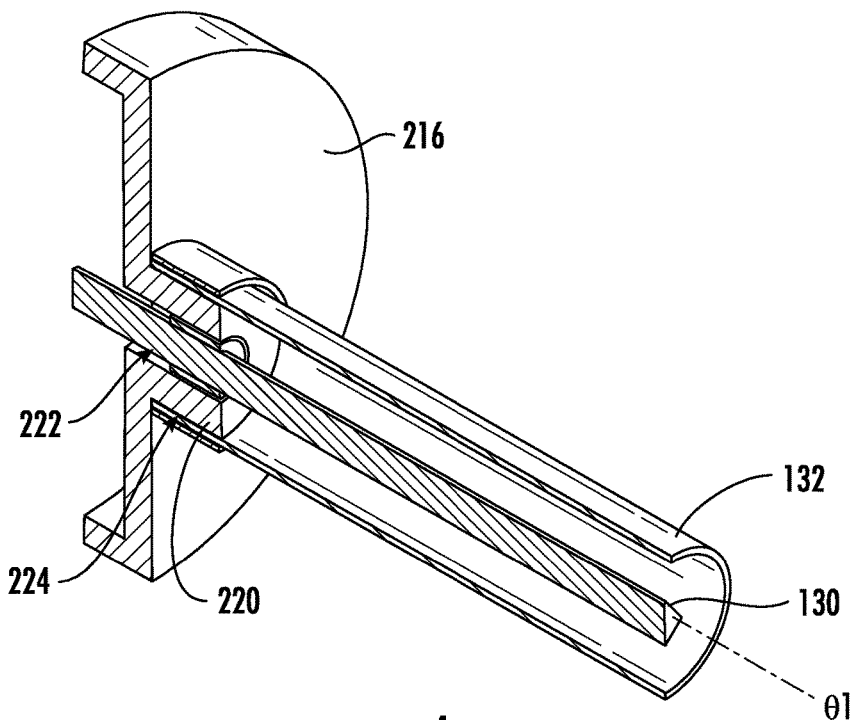
FIG. 4 provides a cross-sectional perspective view of a portion, including a drive shaft, of the exemplary lopper head of FIG. 2.

As noted above, primary gear 204 is generally provided in mechanical communication with drive shaft 130 (e.g., coupled to or formed as part of drive shaft 130—FIG. 1). In some embodiments, one or more intermediate gears may be provided to facilitate communication between the drive shaft 130 and primary gear 204 (e.g., while adjusting the torque output or speed of the primary gear 204 relative to the drive shaft 130). For instance, a gearbox 214 may be provided in mechanical communication between drive shaft 130 and primary gear 204. For instance, as shown especially in FIG. 4) gearbox 214 may include a baseplate 216 coupled to drive shaft 130. The baseplate 216 may include a collared bushing 220 defining a central opening 222 (e.g., along the primary axis θ1) through which drive shaft 130 extends. Optionally, a collar recess 224 may be defined (e.g., coaxial with the central opening 222) to receive and hold a distal end of shaft pole 132.

Figure 5A:
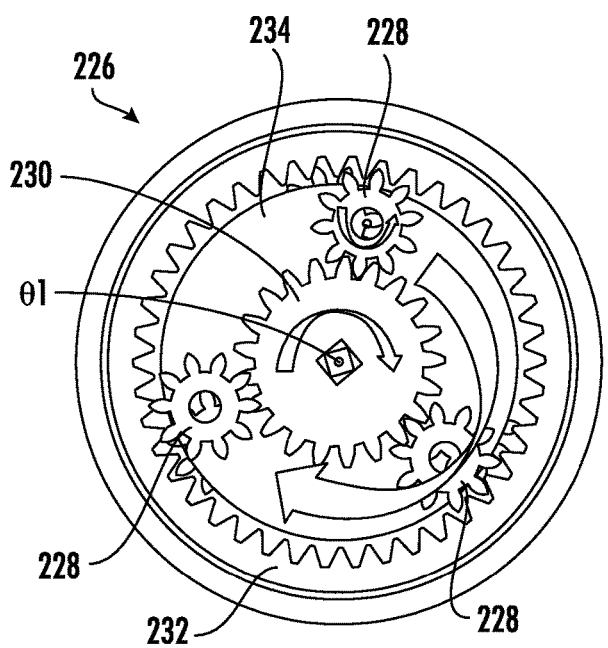
FIG. 5A provides a sectional view of a planetary gearbox, perpendicular to a primary axis, the exemplary lopper head of FIG. 2.
Figure 5B:
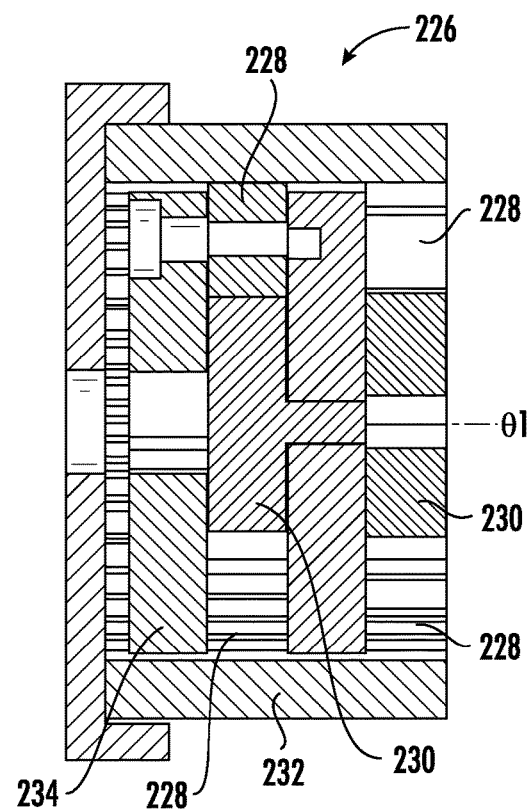
FIG. 5B provides a sectional view of a planetary gearbox, parallel to a primary axis, the exemplary lopper head of FIG. 2.
Figure 6:
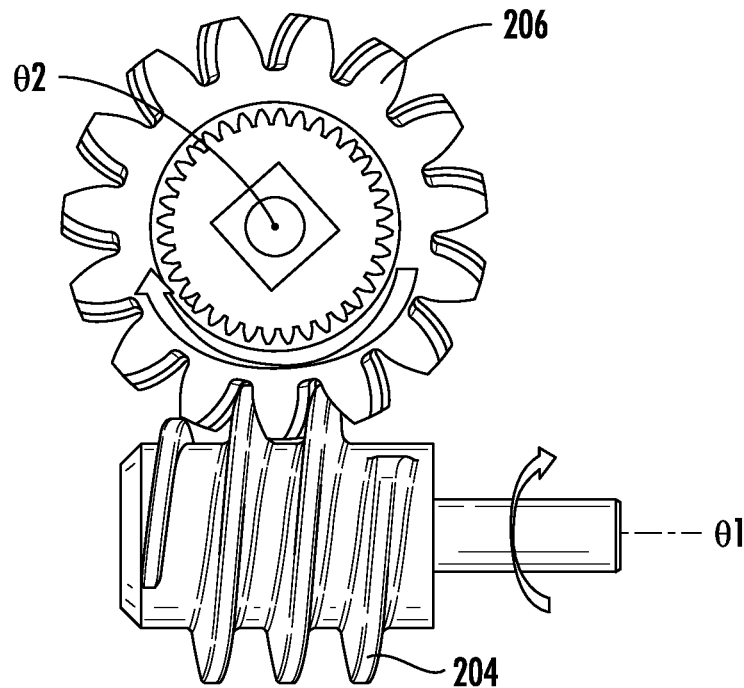
FIG. 6 provides a side elevation view of a primary gear and a secondary gear of the exemplary lopper head of FIG. 2.
Figure 7:
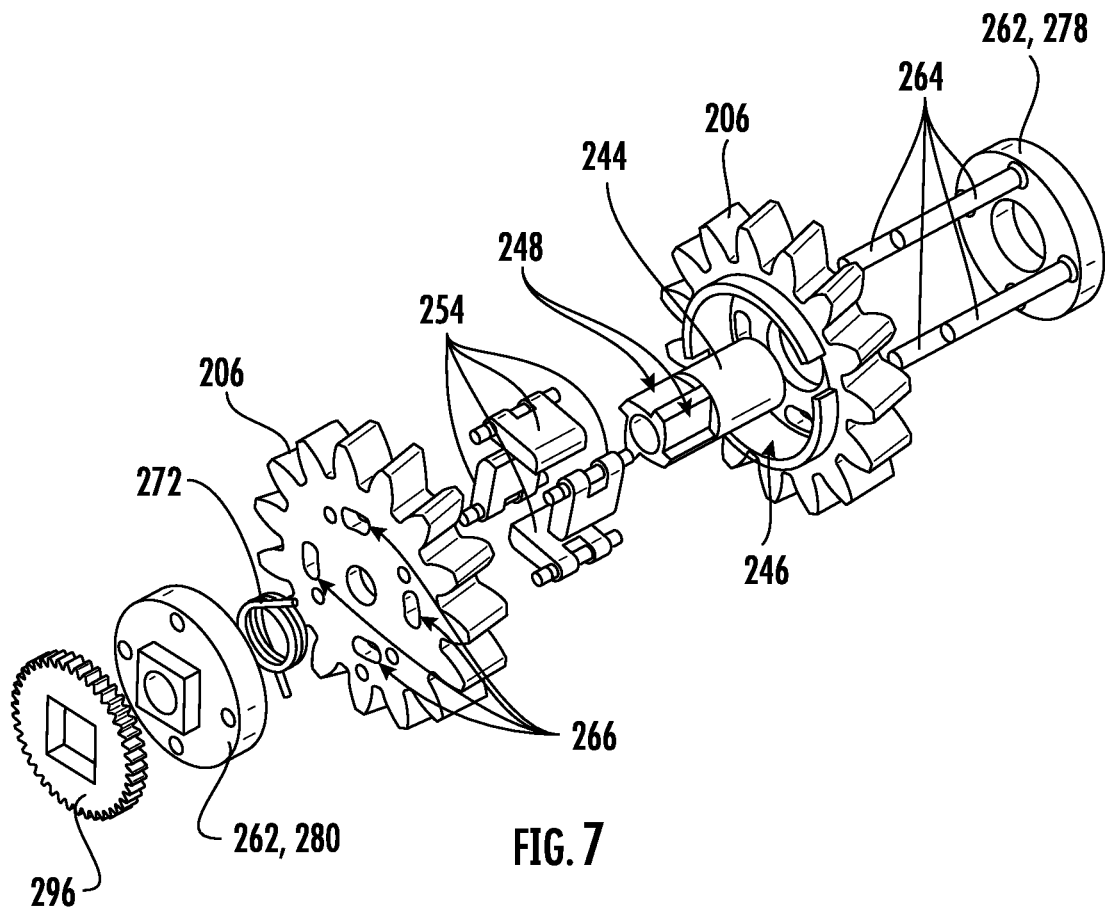
FIG. 7 provides an exploded perspective view of a portion, including a secondary gear and dampened cylinder, of the exemplary lopper head of FIG. 2.
Figure 8:
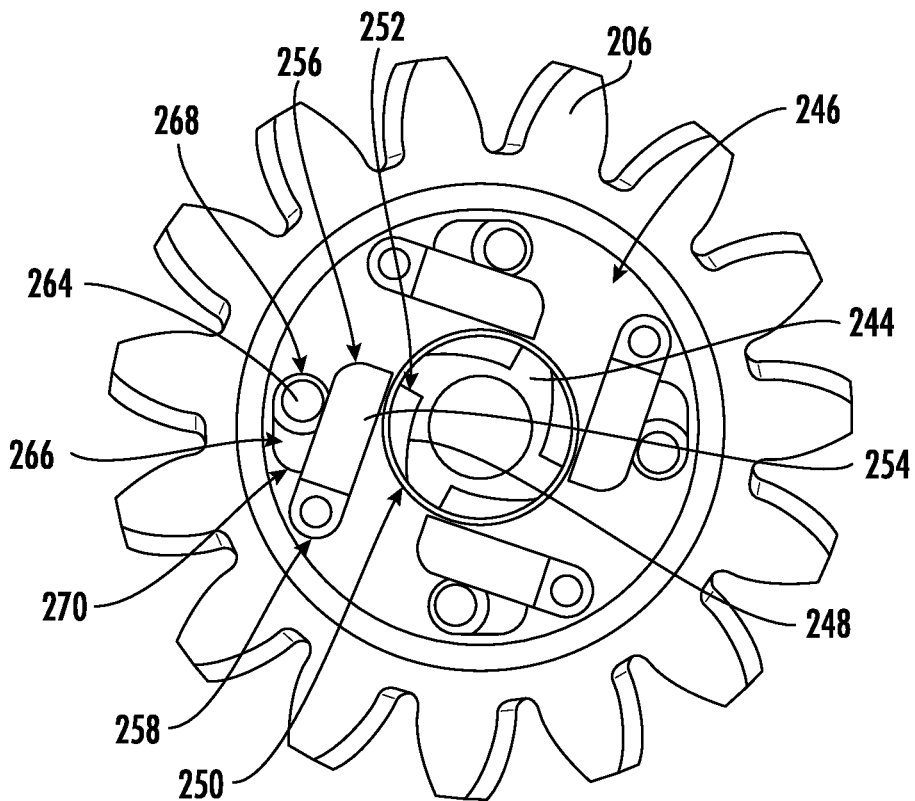
FIG. 8 provides a plan view of an interior portion of the secondary gear and multiple engagement flags of the exemplary lopper head of FIG. 2, wherein the engagement flags are in a disengaged position.

In the illustrated embodiments, the gearbox 214 includes a planetary gear assembly 226 having multiple planetary gears 228 enmeshed or rotatable about one or more sun gears 230. As illustrated in FIGS. 5A and 5B, which show various cross-sectional views of gearbox 214 according to exemplary embodiments, at least one sun gear 230 may be coupled to drive shaft 130 to be rotated by drive shaft 130 and, in turn, rotate multiple planetary gears 228 enmeshed with sun gear 230. Additionally or alternatively, one or more ring gears 232 may be enmeshed with and radially outward from various planetary gears 228. In some embodiments, planetary gear assembly 226 is rotatable about primary axis θ1. For instance, one or more sun gears 230 may be set coaxial with primary axis θ1 while the planetary gears 228 are disposed about and radially outward from primary axis θ1 (e.g., to orbit about primary axis θ1). In some embodiments, a carrier plate 234 couples gearbox 214 to primary gear 204. For instance, a plate rod 236 may be fixed to carrier plate 234 (e.g., to rotate therewith) and extend along the primary axis θ1 while coupling with primary gear 204. Optionally, multiple gear stages may be provided (e.g., connected by one or more carrier plates or sun gears 230 coupled to adjacent planetary gears 228 and spaced apart along the primary axis θ1), such as to adjust the desired gearing to primary gear 204. For instance, the set gear ratio for the gearbox 214 relative to drive shaft 130 may be greater than or equal to 9:1 for output:input rotation. Additionally or alternatively, the set gear ratio for the gearbox 214 relative to drive shaft 130 may be greater than or equal to 27:1 for output:input rotation.

As noted above, primary gear 204 is disposed along and is rotatable about a primary axis θ1. For instance, primary gear 204 may be parallel to or coaxial with drive shaft 130 to rotate about the same primary axis θ1 (e.g., as motivated through the gearbox 214). Generally, primary gear 204 includes or is provided as any suitable rotatable gear. In certain embodiments, primary gear 204 includes or is provided as a worm gear having at least one helical tooth wrapped about and along the primary axis θ1.

Turning especially to FIGS. 2, 3, 6 through 8, and 12 through 16, various views are provided illustrating secondary gear 206 according to exemplary embodiments. As noted above, secondary gear 206 may be enmeshed with the primary gear 204. In particular, secondary gear 206 may be mounted to rotate (i.e., be rotatable) about a secondary axis θ2. Secondary gear 206 may be provided as with any suitable gear-tooth profile, such as a helical or spur gear to engage the tooth or teeth of primary gear 204. Optionally, the set gear ratio for the secondary gear 206 relative to primary gear 204 may be greater than or equal to 15:1 for output:input rotation.

In some embodiments, secondary axis θ2 is non-parallel to primary axis θ1. Optionally, secondary axis θ2 may be perpendicular to primary axis θ1 or radially spaced apart from primary axis θ1. In certain embodiments, secondary axis θ2 is defined by a support pin 240 held on one or more fixed support arms 242 (e.g., mounted to a casing, housing, or other non-rotating frame member). For instance, a pair of support arms 242 may be disposed on opposite ends relative to secondary axis θ2. In some such embodiments, secondary gear 206 and blade assembly 208 are sandwiched between support arms 242.

Along with secondary gear 206, a ratchet gear 244 may be rotatable about the secondary axis θ2 (e.g., separately from secondary gear 206). For instance, ratchet gear 244 may be coaxial with secondary gear 206. In some embodiments, ratchet gear 244 is disposed radially inward (e.g., relative to secondary axis θ2) from the gear teeth of secondary gear 206. As shown, the ratchet gear 244 may even be held within secondary gear 206. In some such embodiments, secondary gear 206 defines an internal gear chamber 246 into which ratchet gear 244 is extended. A central hole in fluid communication with internal gear chamber 246 may receive a post of (or be coupled to) ratchet gear 244 such that ratchet gear 244 remains in communication with a portion of lopper head 200 outside of internal gear chamber 246. As will be described in detail below, in the region outside of internal gear chamber 246, ratchet gear 244 may be mated or fixed to a separate intermediary gear 286.

As illustrated, ratchet gear 244 itself may define one or more curved ratchet teeth 248. Such ratchet teeth 248 may each extend along a taper, slope, or curve from an outer end 250 to an inner end 252 that is circumferentially spaced apart from the outer end 250. Inner end 252 may be proximal to secondary axis θ2 and outer end 250 may be distal to secondary axis θ2 (e.g., along a radial direction outward from secondary axis θ2). In some embodiments, inner end 252 terminates at a blunt wall or nose, which may be acted upon to motivate or rotate ratchet gear 244, as will be described in detail below.

Although separately rotatable, secondary gear 206 and ratchet gear 244 may be in selective mechanical communication such that, in certain selected states, secondary gear 206 motivates rotation of ratchet gear 244 (e.g., to rotate both secondary gear 206 and ratchet gear 244 in tandem about secondary axis θ2). In some embodiments, one or more engagement flags 254 are mounted to secondary gear 206 (e.g., apart from or radially outward from secondary axis θ2). For instance, a plurality of engagement flags 254 may be circumferentially spaced apart from each other about secondary axis θ2. In some embodiments, the engagement flags 254 are mounted and held within the secondary gear 206 (e.g., within the internal gear chamber 246).

Figure 9:
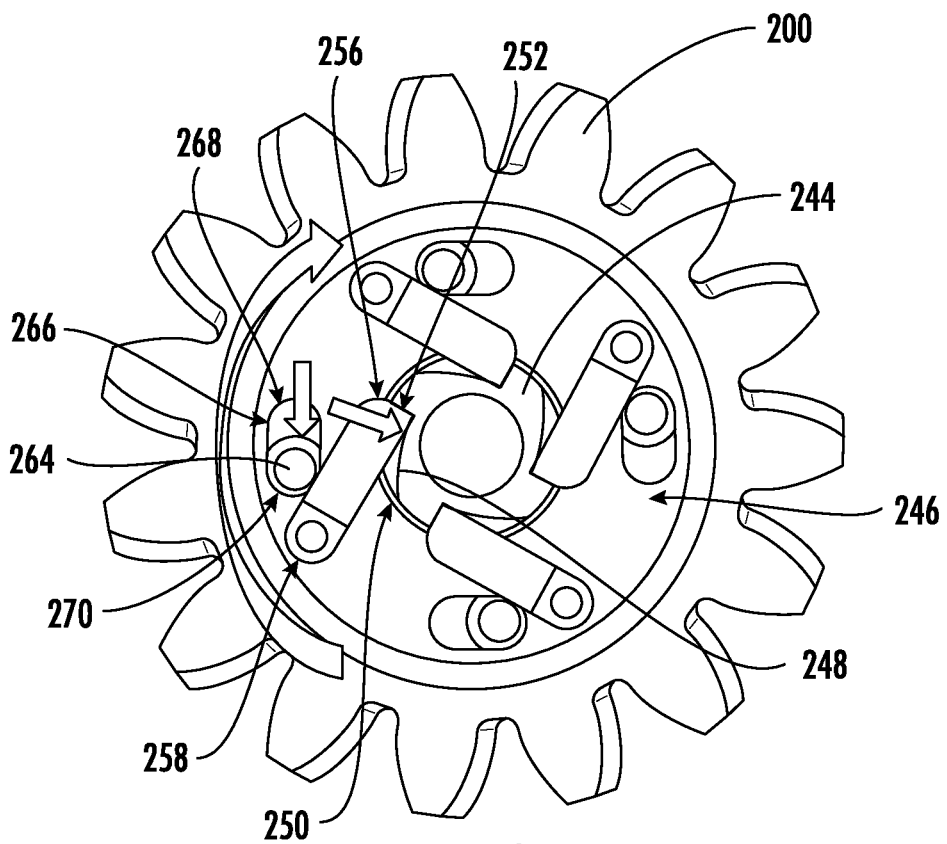
FIG. 9 provides a plan view of an interior portion of the secondary gear and multiple engagement flags of the exemplary lopper head of FIG. 2, wherein the engagement flags are in an engaged position.

Being mounted on secondary gear 206 apart from secondary axis θ2, the engagement flags 254 may generally rotate with secondary gear 206 about secondary axis θ2. In addition, the engagement flags 254 may be movable (e.g., pivotable) relative to secondary gear 206. For instance, each engagement flag 254 may define a separate corresponding flag axis (e.g., parallel to the secondary axis θ2) about which each engagement flag 254 can move between an unengaged position and an engaged position. As illustrated, for instance, in FIG. 8, in the unengaged position, the engagement flags 254 may be positioned apart from the ratchet gear 244. In particular, a free end 256 (e.g., opposite of a pivot end 258) of the engagement flags 254 may be held radially outward from the ratchet teeth 248. By contrast, and as illustrated, for instance, in FIG. 9, in the engaged position, the engagement flags 254 may be disposed on and in mechanical communication with the ratchet gear 244. In particular, the free end 256 may be engaged with the ratchet teeth 248 (e.g., such that each free end 256 sits against a corresponding blunt wall or nose of a tooth of the ratchet gear 244). In optional embodiments, one or more of the engagement flags 254 are provided with a flag spring 260, such as a torsion spring mounted along the corresponding flag axis. For instance, each flag spring 260 may be mounted or disposed in biased engagement with the corresponding engagement flag 254 to bias the engagement flag 254 toward the unengaged position.

One or more dampened lag bolts 264 may be provided (e.g., as part of a dampened cylinder 262) to selectively permit, guide, or motivate corresponding engagement flags 254 between the unengaged position and engaged position. For instance, the lag bolts 264 may extend to and within at least a portion of gear chamber 246. In some embodiments, secondary gear 206 defines a lag groove 266 that is radially offset from the secondary axis θ2 to receive a corresponding lag bolt 264. For instance, each lag groove 266 may be defined radially outward from the free end 256 of engagement flags 254 relative to the secondary axis θ2. Thus, lag bolt 264 may similarly be disposed radially outward from the free end 256 of engagement flags 254.

Generally, the lag groove 266 defines a circumferential groove length from a first groove end 268 to a second groove end 270. As shown, the circumferential groove length may extend along a circumferential direction defined about the secondary axis θ2. Each lag bolt 264 may have a diameter or width that is smaller than the circumferential groove length and is able to move (e.g., slide) relative to the secondary gear 206 (e.g., between a permissive position and a restrictive position). As illustrated, for instance, in FIG. 8, in the permissive position, the lag bolts 264 may generally permit corresponding engagement flags 254 to the unengaged position (e.g., as directed by the lag bolts or a separate motivating force, such as a spring or gravity). The ratchet gear 244 may be rotatable relative to secondary gear 206. Optionally, each lag bolt 264 may be disposed distal to the pivot end 258 of the corresponding engagement flag 254 (e.g., at the first groove end 268). By contrast, and as illustrated, for instance, in FIG. 9, in the restrictive position, the lag bolts 264 may generally hold the engagement flags 254 in the engaged position (e.g., rotated inward). Optionally, each lag bolt 264 may be disposed proximal to the pivot end 258 of the corresponding engagement flag 254 (e.g., at the second groove end 270).

As noted above, lag bolts 264 may be provided as part of a dampened cylinder 262. For instance, a first bracket 278 of the dampened cylinder 262 may hold a plurality of lag bolts 264, which are circumferentially spaced apart from each other about secondary axis θ2 and may, thus, move (e.g., pivot) together about secondary axis θ2 (e.g., between the permissive position and the restrictive position). The lag bolts 264 may further extend axially from or across dampened cylinder 262 at corresponding positions radially offset from secondary axis θ2. The lag bolts 264 may extend parallel to and, optionally, through secondary gear 206. The lag bolts 264 may further couple to a second bracket 280 that is disposed on the opposite side of secondary gear 206 from first bracket 278. When assembled, the dampened cylinder 262 may be at least partially movable (e.g., pivotable) relative to the secondary gear 206 about secondary axis θ2.

In particular, the dampened cylinder 262 may be pivotable between the permissive and restrictive positions. In optional embodiments, the dampened cylinder 262 (e.g., first or second brackets 278, 280 thereof) is provided with a bracket spring 272, such as torsion spring coaxial with secondary axis θ2. For instance, the bracket spring 272 may be mounted or disposed (e.g., on secondary gear 206) in biased engagement with the dampened cylinder 262 to bias the dampened cylinder 262 relative to the secondary gear 206 and toward the permissive position.

Figure 10:
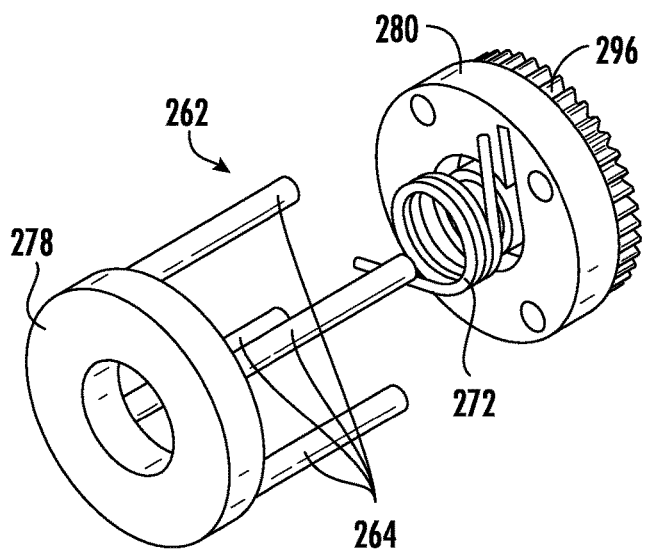
FIG. 10 provides an exploded perspective view of a portion, including a dampened cylinder, of the exemplary lopper head of FIG. 2.
Figure 11:
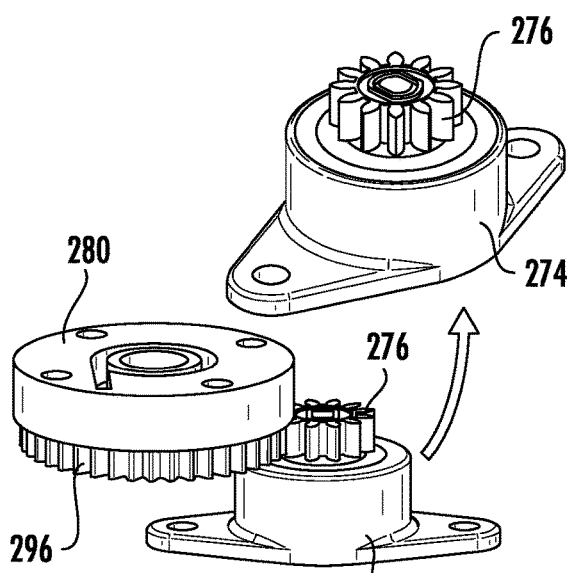
FIG. 11 provides an exploded perspective view of a portion, including a dampened cylinder and dampener gear, of the exemplary lopper head of FIG. 2.

Turning briefly to FIGS. 10 and 11, various views are provided illustrating dampened cylinder 262 and a rotary dampener 274. In certain embodiments, a rotary dampener 274 is provided in mechanical communication with dampened cylinder 262 (e.g., apart from secondary gear 206). For instance, rotary dampener 274 may be fixed to a support arm 242 opposite of blade assembly 208 (e.g., proximal to the opposite side of secondary gear 206 than blade assembly 208). Generally, rotary dampener 274 includes a damper gear 276 coupled to a damper body (e.g., holding a set volume of oil configured to damper torque or rotation of the damper gear 276, as is understood). Damper gear 276 may be radially offset from secondary axis θ2 to rotate about a parallel axis (e.g., parallel to secondary axis θ2). Separate from or in addition to rotary dampener 274, an engagement gear 296 may be fixed to dampened cylinder 262 (e.g., and coaxial therewith) to rotate in tandem with dampened cylinder 262 about secondary axis θ2. As shown, engagement gear 296 may be disposed on an outer face of dampened cylinder 262 (e.g., at the second bracket 280). Moreover, engagement gear 296 may be enmeshed with damper gear 276. In turn, rotation of dampened cylinder 262 may be generally dampened by mechanical communication with rotary dampener 274.

Returning generally to FIGS. 2, 3, and 6 through 16, various views are provided to illustrate the blade assembly 208. As shown, blade assembly 208 may include a pair of sharpened blades that are movable relative to each other. For instance, a static blade 212 may be fixed (e.g., mounted to a support arm 242 or other non-rotating member) while a cutting blade 210 may be rotatable about a set blade axis (e.g., parallel to secondary axis θ2) to pivot (e.g., relative to static blade 212) between an open position and a closed position. As illustrated, for instance, in FIG. 13A, in the open position, the cutting blade 210 may be pivoted upward. The distal tip of a sharpened edge or cutting blade 210 generally may be held apart from static blade 212. By contrast, and as illustrated, for instance, in FIG. 13B, in the closed position, the cutting blade 210 may be pivoted downward. The distal tip of the sharpened edge or cutting blade 210 generally may be held against or adjacent to static blade 212.

As shown, cutting blade 210 may be in mechanical communication with ratchet gear 244. In turn, cutting blade 210 may be pivoted by or in response to rotation of the ratchet gear 244. For instance, an intermediary gear 286 (e.g., spur gear) may be mounted or fixed to ratchet. Intermediary gear 286 may, for example, be coaxial with ratchet gear 244 to rotate in tandem with the same. A set of blade gear teeth 282 may extend from a portion of cutting blade 210, such as to enmesh with intermediary gear 286. In optional embodiments, the cutting blade 210 is provided with a blade spring 284, such as torsion spring coaxial with the blade axis. For instance, the blade spring 284 may be mounted or disposed (e.g., on the blade gear) in biased engagement with the cutting blade 210 to bias the cutting blade 210 relative to the blade and toward the open position.

A blade stop may be further provided, such as to restrict the cutting blade 210 from rotating beyond the set open position.

During use of the lopper head 200 (e.g., in response to user pressing the trigger or otherwise activating the tool motor 112 to rotate), the drive shaft 130 may drive or motivate the primary gear 204 to rotate (e.g., through rotation of the gearbox 214) about the primary axis θ1. The primary gear 204 may, in turn, rotate the secondary gear 206. Prior to being rotated, the dampened cylinder 262, engagement flags 254, and cutting blade 210 may be in a default state. For instance, the dampened cylinder 262—a lag bolts 264 thereof—may be in the permissive position, the engagement flags 254 may be in the unengaged position, and the cutting blade 210 may be in the open position. Rotation of the dampened cylinder 262 may be dampened as the secondary gear 206 rotates, thus, the secondary gear 206 may initially rotate faster to bring the second groove end 270 of the grooves to the lag bolts 264 such that the lag bolts 264 and dampened cylinder 262 are in the restrictive position before the secondary gear 206 and dampened cylinder 262 are able to rotate together. From the engagement of the lag bolts 264, the engagement flags 254 may be moved inward and to the engaged position in mechanical communication with the ratchet gear 244. The engagement flags 254 generally rotate with the secondary gear 206 and, thus, force the ratchet gear 244 to rotate. Mechanical communication between the ratchet gear 244 and cutting blade 210 may force the cutting blade 210 to rotate downward.

When the trigger is released (e.g., prior to the cutting blade 210 reaching the closed position), rotation of the drive shaft 130, primary gear 204, and secondary gear 206 may be halted. Nonetheless, the dampened cylinder 262 may be able to rotate slightly to the permissive position. In turn, the engagement flags 254 may return to the unengaged position and the blade may be returned to the open position.

Advantageously, tools in accordance with the present disclosure may automatically (e.g., without further or direct user intervention) return a cutting blade 210 to an open (e.g., fully open) position, regardless of whether the cutting blade 210 has reached a closed (e.g., fully closed) position. Notably, such tools may be reliable and robust, not directly relying on electronics for return to the open position.

Further aspects of the invention are provided by one or more of the following embodiments:

Embodiment 1. A lopper comprising: a tool motor; a drive shaft extending along a primary axis and mechanically coupled to the tool motor to be rotated thereby; a primary gear in mechanical communication with the drive shaft and rotatable about the primary axis; a secondary gear enmeshed with the primary gear and rotatable about a secondary axis, the secondary gear defining a lag groove radially offset from the secondary axis; a ratchet gear rotatable about the secondary axis separately from the secondary gear; an engagement flag rotatably mounted to secondary gear to move between an unengaged position apart from the ratchet gear and a engaged position disposed on and in mechanical communication with the ratchet gear; a dampened lag bolt slidably received within the lag groove to move relative to the secondary gear between a permissive position permitting the engagement flag to the unengaged position and a restrictive position holding the engagement flag in the engaged position; and a cutting blade in mechanical communication with the ratchet gear to be pivoted thereby, in the engaged position of the engagement flag, to a closed position from an open position.

Embodiment 2. The lopper of any one or more of the embodiments, further comprising a planetary gear assembly rotatable about the primary axis in mechanical communication with the primary gear to motivate rotation of the primary gear about the primary axis.

Embodiment 3. The lopper of any one or more of the embodiments, wherein the primary gear is a worm gear.

Embodiment 4. The lopper of any one or more of the embodiments, wherein the ratchet gear and the engagement flag are held within the secondary gear.

Embodiment 5. The lopper of any one or more of the embodiments, wherein the engagement flag is one flag of a plurality of engagement flags circumferentially spaced apart about the secondary axis.

Embodiment 6. The lopper of any one or more of the embodiments, further comprising a flag spring in biased engagement with the engagement flag to bias the engagement flag toward the unengaged position.

Embodiment 7. The lopper of any one or more of the embodiments, wherein the lag groove defines a circumferential groove length from a first groove end to a second groove end, wherein the dampened lag bolt is disposed at the first groove end in the permissive position, and wherein the dampened lag bolt is disposed at the second groove end in the restrictive position.

Embodiment 8. The lopper of any one or more of the embodiments, further comprising a dampened cylinder rotatably about the secondary axis, wherein the dampened lag bolt is fixed to the dampened cylinder and extends axially therefrom at a position radially offset from the secondary axis such that the dampened lag bolt is pivoted about the secondary axis between the permissive position and the restrictive position.

Embodiment 9. The lopper of any one or more of the embodiments, further comprising a bracket spring in biased engagement with the dampened cylinder to bias the dampened cylinder relative to the secondary gear and toward the permissive position.

Embodiment 10. The lopper of any one or more of the embodiments, further comprising a blade spring in biased engagement with the cutting blade to bias the cutting blade toward the open position.

Embodiment 11. A lopper head attachment comprising: a primary gear rotatable about a primary axis; a secondary gear enmeshed with the primary gear and rotatable about a secondary axis, the secondary gear defining a lag groove radially offset from the secondary axis; a ratchet gear rotatable about the secondary axis separately from the secondary gear; an engagement flag rotatably mounted to secondary gear to move between an unengaged position apart from the ratchet gear and a engaged position disposed on and in mechanical communication with the ratchet gear; a dampened lag bolt slidably received within the lag groove to move relative to the secondary gear between a permissive position permitting the engagement flag to the unengaged position and a restrictive position holding the engagement flag in the engaged position; and a cutting blade in mechanical communication with the ratchet gear to be pivoted thereby, in the engaged position of the engagement flag, to a closed position from an open position.

Embodiment 12. The lopper head attachment of any one or more of the embodiments, further comprising a planetary gear assembly rotatable about the primary axis in mechanical communication with the primary gear to motivate rotation of the primary gear about the primary axis.

Embodiment 13. The lopper head attachment of any one or more of the embodiments, wherein the primary gear is a worm gear.

Embodiment 14. The lopper head attachment of any one or more of the embodiments, wherein the ratchet gear and the engagement flag are held within the secondary gear.

Embodiment 15. The lopper head attachment of any one or more of the embodiments, wherein the engagement flag is one flag of a plurality of engagement flags circumferentially spaced apart about the secondary axis.

Embodiment 16. The lopper head attachment of any one or more of the embodiments, further comprising a flag spring in biased engagement with the engagement flag to bias the engagement flag toward the unengaged position.

Embodiment 17. The lopper head attachment of any one or more of the embodiments, wherein the lag groove defines a circumferential groove length from a first groove end to a second groove end, wherein the dampened lag bolt is disposed at the first groove end in the permissive position, and wherein the dampened lag bolt is disposed at the second groove end in the restrictive position.

Embodiment 18. The lopper head attachment of any one or more of the embodiments, further comprising a dampened cylinder rotatably about the secondary axis, wherein the dampened lag bolt is fixed to the dampened cylinder and extends axially therefrom at a position radially offset from the secondary axis such that the dampened lag bolt is pivoted about the secondary axis between the permissive position and the restrictive position.

Embodiment 19. The lopper head attachment of any one or more of the embodiments, further comprising a bracket spring in biased engagement with the dampened cylinder to bias the dampened cylinder relative to the secondary gear and toward the permissive position.

Embodiment 20. The lopper head attachment of any one or more of the embodiments, further comprising a blade spring in biased engagement with the cutting blade to bias the cutting blade toward the open position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A lopper comprising:
   a tool motor;
   a drive shaft extending along a primary axis and mechanically coupled to the tool motor to be rotated thereby;
   a primary gear in mechanical communication with the drive shaft and rotatable about the primary axis;
   a secondary gear enmeshed with the primary gear and rotatable about a secondary axis, the secondary gear defining a lag groove radially offset from the secondary axis;
   a ratchet gear rotatable about the secondary axis separately from the secondary gear;
   an engagement flag rotatably mounted to the secondary gear to move between an unengaged position apart from the ratchet gear and an engaged position disposed on and in mechanical communication with the ratchet gear;
   a dampened lag bolt received within the lag groove to move relative to the secondary gear between a permissive position permitting the engagement flag to the unengaged position and a restrictive position holding the engagement flag in the engaged position;
   a cutting blade in mechanical communication with the ratchet gear to be pivoted thereby, in the engaged position of the engagement flag, to a closed position from an open position; and
   a planetary gear assembly rotatable about the primary axis in mechanical communication with the primary gear and the tool motor to transfer rotation from the tool motor to the primary gear to motivate rotation of the primary gear about the primary axis.

2. The lopper of claim 1, wherein the primary gear is a worm gear.

3. The lopper of claim 1, wherein the ratchet gear and the engagement flag are held within the secondary gear.

4. The lopper of claim 1, wherein the engagement flag is one flag of a plurality of engagement flags circumferentially spaced apart about the secondary axis.

5. The lopper of claim 1, further comprising a flag spring in biased engagement with the engagement flag to bias the engagement flag toward the unengaged position.

6. The lopper of claim 1, wherein the lag groove defines a circumferential groove length from a first groove end to a second groove end, wherein the dampened lag bolt is disposed at the first groove end in the permissive position, and wherein the dampened lag bolt is disposed at the second groove end in the restrictive position.

7. The lopper of claim 1, further comprising a dampened cylinder rotatable about the secondary axis, wherein the dampened lag bolt is fixed to the dampened cylinder and extends axially therefrom at a position radially offset from the secondary axis such that the dampened lag bolt is pivoted about the secondary axis between the permissive position and the restrictive position.

8. The lopper of claim 7, further comprising a bracket spring in biased engagement with the dampened cylinder to bias the dampened cylinder relative to the secondary gear and toward the permissive position.

9. The lopper of claim 1, further comprising a blade spring in biased engagement with the cutting blade to bias the cutting blade toward the open position.

10. A lopper head attachment comprising:
    a primary gear rotatable about a primary axis;
    a secondary gear enmeshed with the primary gear and rotatable about a secondary axis, the secondary gear defining a lag groove radially offset from the secondary axis;
    a ratchet gear rotatable about the secondary axis separately from the secondary gear;
    an engagement flag rotatably mounted to the secondary gear to move between an unengaged position apart from the ratchet gear and an engaged position disposed on and in mechanical communication with the ratchet gear;
    a dampened lag bolt received within the lag groove to move relative to the secondary gear between a permissive position permitting the engagement flag to the unengaged position and a restrictive position holding the engagement flag in the engaged position;
    a cutting blade in mechanical communication with the ratchet gear to be pivoted thereby, in the engaged position of the engagement flag, to a closed position from an open position; and
    a flag spring in biased engagement with the engagement flag to bias the engagement flag toward the unengaged position.

11. The lopper head attachment of claim 10, further comprising a planetary gear assembly rotatable about the primary axis in mechanical communication with the primary gear and the tool motor to transfer rotation from a tool motor to the primary gear to motivate rotation of the primary gear about the primary axis.

12. The lopper head attachment of claim 10, wherein the primary gear is a worm gear.

13. The lopper head attachment of claim 10, wherein the ratchet gear and the engagement flag are held within the secondary gear.

14. The lopper head attachment of claim 10, wherein the engagement flag is one flag of a plurality of engagement flags circumferentially spaced apart about the secondary axis.

15. The lopper head attachment of claim 10, wherein the lag groove defines a circumferential groove length from a first groove end to a second groove end, wherein the dampened lag bolt is disposed at the first groove end in the permissive position, and wherein the dampened lag bolt is disposed at the second groove end in the restrictive position.

16. The lopper head attachment of claim 10, further comprising a dampened cylinder rotatable about the secondary axis, wherein the dampened lag bolt is fixed to the dampened cylinder and extends axially therefrom at a position radially offset from the secondary axis such that the dampened lag bolt is pivoted about the secondary axis between the permissive position and the restrictive position.

17. The lopper head attachment of claim 16, further comprising a bracket spring in biased engagement with the dampened cylinder to bias the dampened cylinder relative to the secondary gear and toward the permissive position.

18. The lopper head attachment of claim 10, further comprising a blade spring in biased engagement with the cutting blade to bias the cutting blade toward the open position.

19. A lopper head attachment comprising:

a primary gear rotatable about a primary axis;

a secondary gear enmeshed with the primary gear and rotatable about a secondary axis, the secondary gear defining a lag groove radially offset from the secondary axis;

a ratchet gear rotatable about the secondary axis separately from the secondary gear;

an engagement flag rotatably mounted to the secondary gear to move between an unengaged position apart from the ratchet gear and an engaged position disposed on and in mechanical communication with the ratchet gear;

a dampened lag bolt received within the lag groove to move relative to the secondary gear between a permissive position permitting the engagement flag to the unengaged position and a restrictive position holding the engagement flag in the engaged position;

a cutting blade in mechanical communication with the ratchet gear to be pivoted thereby, in the engaged position of the engagement flag, to a closed position from an open position; and a dampened cylinder rotatable about the secondary axis, wherein the dampened lag bolt is fixed to the dampened cylinder and extends axially therefrom at a position radially offset from the secondary axis such that the dampened lag bolt is pivoted about the secondary axis between the permissive position and the restrictive position.

20. The lopper head attachment of claim 19, further comprising a bracket spring in biased engagement with the dampened cylinder to bias the dampened cylinder relative to the secondary gear and toward the permissive position.

* * * * *